March 21, 1939.　　　A. FIORENTINO　　　2,151,094

DEVICE FOR REDUCING FRICTIONS IN SYSTEMS OF THE WORM AND NUT TYPE

Filed Feb. 3, 1937　　　5 Sheets-Sheet 1

INVENTOR:
ALDO FIORENTINO
BY Haseltine, Lake & Co.
ATTORNEYS

March 21, 1939.  A. FIORENTINO  2,151,094
DEVICE FOR REDUCING FRICTIONS IN SYSTEMS OF THE WORM AND NUT TYPE
Filed Feb. 3, 1937  5 Sheets-Sheet 2
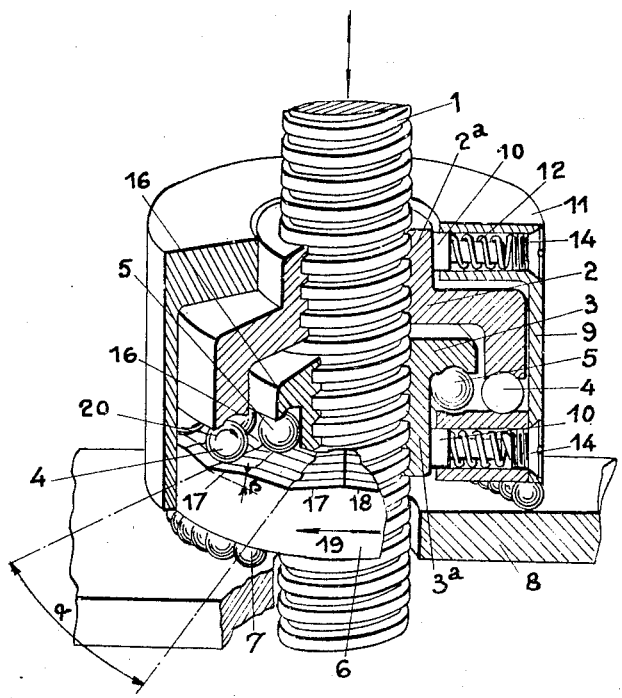
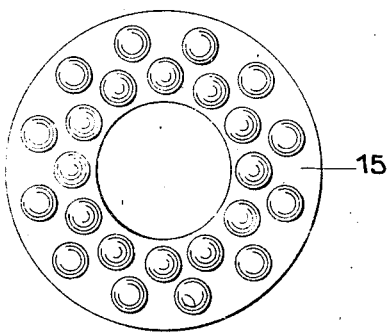
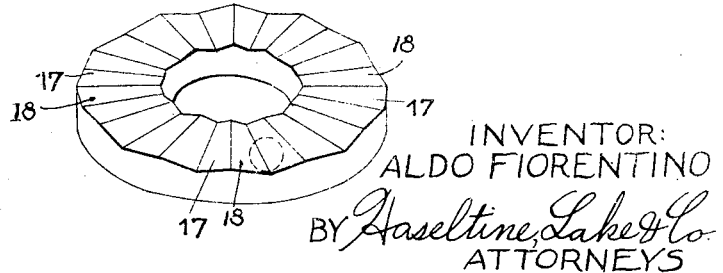
INVENTOR:
ALDO FIORENTINO
BY Haseltine, Lake & Co
ATTORNEYS March 21, 1939.   A. FIORENTINO   2,151,094
DEVICE FOR REDUCING FRICTIONS IN SYSTEMS OF THE WORM AND NUT TYPE
Filed Feb. 3, 1937   5 Sheets-Sheet 3
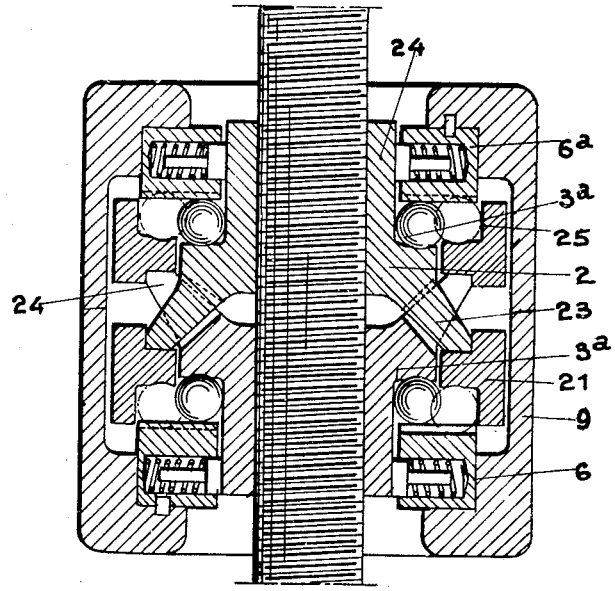
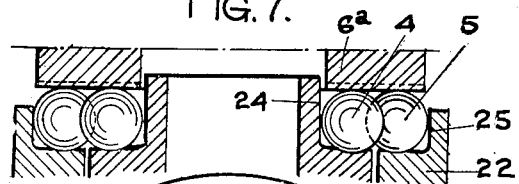
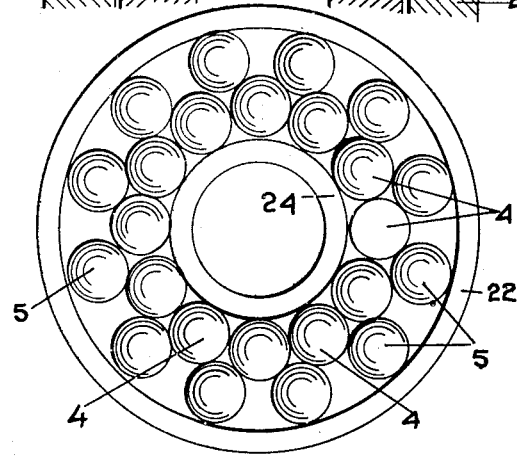
INVENTOR:
ALDO FIORENTINO
BY Haseltine, Lake & Co.
ATTORNEYS March 21, 1939.   A. FIORENTINO   2,151,094
DEVICE FOR REDUCING FRICTIONS IN SYSTEMS OF THE WORM AND NUT TYPE
Filed Feb. 3, 1937   5 Sheets-Sheet 4

INVENTOR:
ALDO FIORENTINO
BY Haseltine, Lake & Co.
ATTORNEYS

March 21, 1939.     A. FIORENTINO     2,151,094

DEVICE FOR REDUCING FRICTIONS IN SYSTEMS OF THE WORM AND NUT TYPE

Filed Feb. 3, 1937     5 Sheets-Sheet 5

INVENTOR:
ALDO FIORENTINO
BY Haseltine, Lake & Co
ATTORNEYS

Patented Mar. 21, 1939

2,151,094

UNITED STATES PATENT OFFICE 2,151,094

DEVICE FOR REDUCING FRICTIONS IN SYSTEMS OF THE WORM AND NUT TYPE

Aldo Fiorentino, Paris, France, assignor to Jean-Marie Heinrich and Marcel Nadaud, both of Paris, France Application February 3, 1937, Serial No. 123,752
In France February 6, 1936

5 Claims. (Cl. 74—424.8)

The present invention relates to devices adapted to a worm and nut system, or its equivalent, for reducing losses by friction.

The devices to which the invention specially refers are characterised, at the functional stand point, by the fact that one or the other of two nuts fitted on the same worm are successively acted upon by means of ball or roller cams, for exerting stresses directed according to the axis of the worm and without the reactions due to these stresses being able to result in thrusts on the screw threads in contact when the nuts and worms have angular relative displacements.

In devices of this type, this functional feature is carried out in the following manner:

A cam exerts on a nut a thrust according to the axis of the worm and without relative movement of the screw threads in engagement, whilst a second nut, unaffected by this thrust, freely rotates on the worm for presenting itself to the action of the cam and receiving in its turn an axial thrust, without relative movement of the screw threads in engagement, the alternate action of the nuts practically ensuring the continuity of the axial stress on the worm.

These devices are applicable to a worm and nut system or its equivalent, as well for obtaining the displacement of a nut along a fixed worm as for obtaining the displacement of a worm relatively to a nut prevented from receiving a movement of axial translation.

In known constructions, the driving cam is provided with a series of alternate projections and recesses distributed on a crown coaxial with the worm and receiving the driving stress which imparts a continuous rotation thereto. The rotation of the cam, in addition to its function which consists in acting, by an axial thrust, on the nuts, must rotatively drive, relatively to the worm, the nut on which the axial thrust is not exerted. For that purpose, the angular connection has been obtained:

By a ratchet and pawls,
By returning springs.

Devices of the above type necessitate extreme accuracy in the construction of the cams. If the pitch of the latter has not a rigorous value relatively to the pitch of the worm, the differences between these pitches accumulate their effects at each revolution of the cam and progressively modify the relative position of the nuts until the operation is rendered impossible.

The invention has particularly for object to remedy these inconveniences and to simplify the devices, as well as far as the parts of the same are concerned, as concerning their machining. For that purpose, it is particularly characterised by the following features applicable separately or in combinations:

(a) The angular connection between the cam and nuts is, for both nuts, ensured solely by friction.

(b) The balls, distributed in two rows in common contact with the cam and respectively in contact with each of the nuts, are held between two side walls co-axial with the nuts and their diameter is determined so that they should take a bearing on each other, in order to allow of dispensing with the cage of the known devices.

(c) In order to provide a device capable of acting for both directions of the axial stresses, two cams are provided on either side of the two nuts, each of the latter bearing directly on one of the cams and bearing on the other cam through the medium of fingers fitting between the corresponding fingers of the other nut.

The invention finally relates to the application of the known or improved devices as just stated, to a worm and worm wheel system.

In this application, the worm is provided with two distinct and juxtaposed screw threads meshing with the same worm wheel, each of the screw threads receiving an axial thrust whilst the other rotates relatively to the worm wheel for remaining in contact with the cam.

The invention further concerns an embodiment in which two worms each subjected to the action of a cam act on one and the same nut having two internal screw threads, both cams being angularly connected from one worm to the other.

In the application of the principle to the worm and worm wheel system, two wheels are provided on a common shaft and mesh with two worms subjected to the action of two cams angularly connected.

The accompanying drawings illustrate, by way of examples only, embodiments of the improvements and of the application above defined.

Fig. 3 is a perspective view, with parts broken away, of a second embodiment.

Fig. 4 is a plan view of a known cage for the balls interposed between the cam and the nuts.

Fig. 5 is a perspective view of the cam.

Fig. 6 is an axial section of a device acting in two directions.

Fig. 7 is an axial section of a detail concerning the assemblage of the balls without a cage.

Fig. 8 is a corresponding plan view, assuming the cam to be removed.

Figure 9:
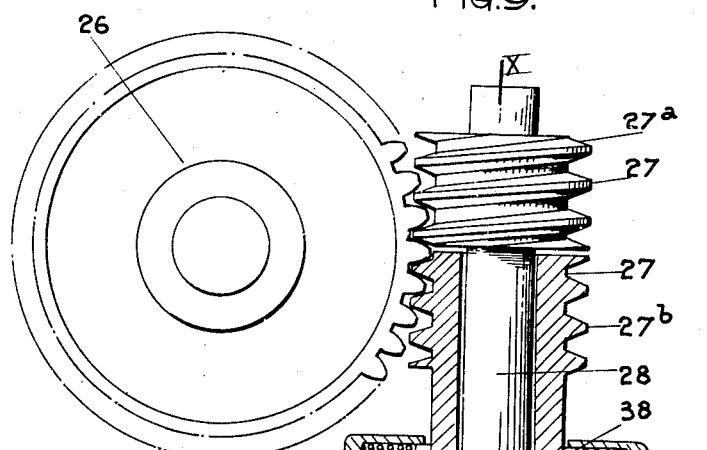
Figure 11:
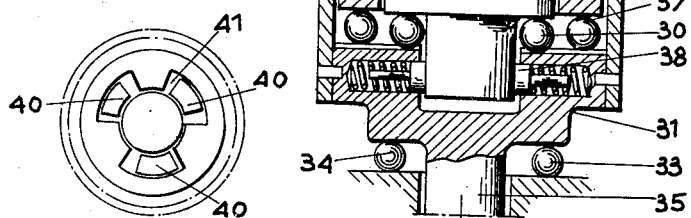
Figure 10:
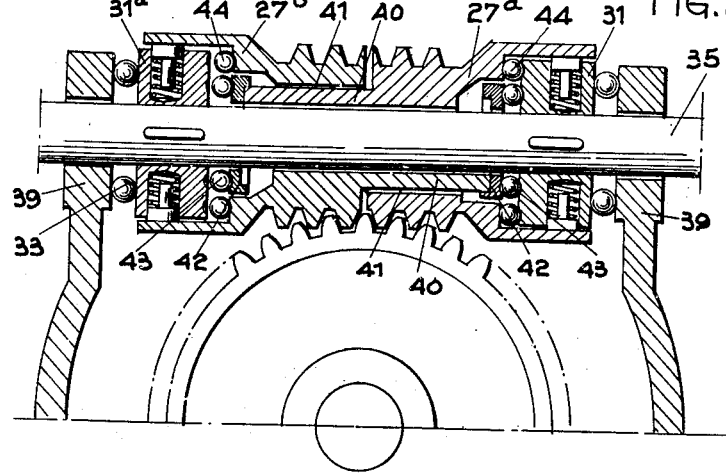

Figs. 9 to 11 relate to the application of devices of the type described to a worm and worm wheel system.

Figure 12:
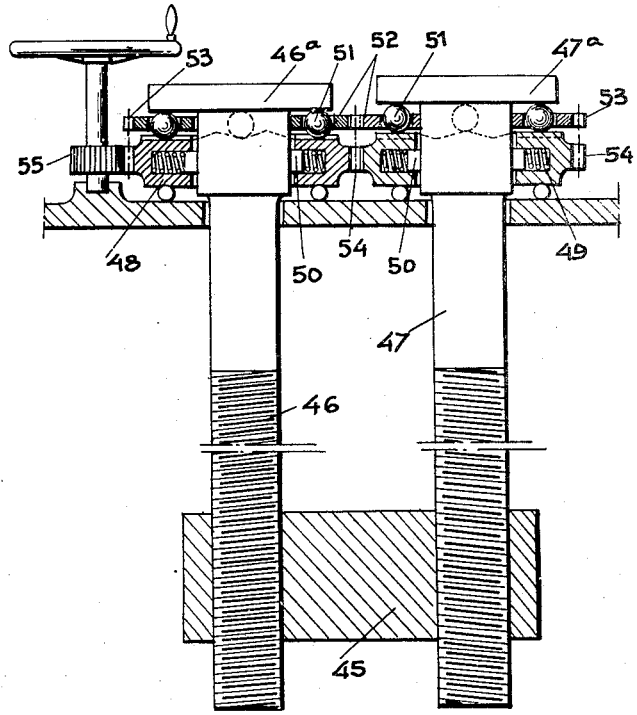

Fig. 12 is an axial section showing an embodiment comprising two worms acting on a common nut having two internal screw threads.

Figure 13:
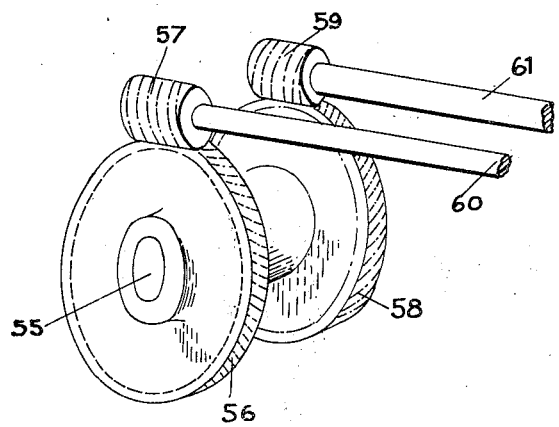

Fig. 13 is a partial perspective view showing the application of the principle of Fig. 10 to the worm and worm wheel system.

Figure 1:
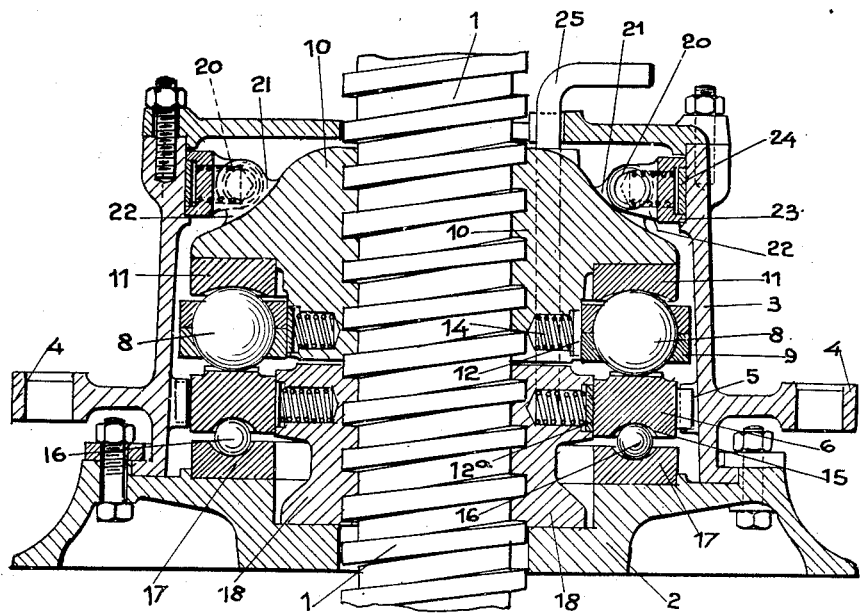
Fig. 1 is a general axial section of a first embodiment of the invention.

The example of Fig. 1 is more particularly applicable to a wine or like press. The worm 1 is fixed and a plate or bed 2 moves in the axial direction for producing a thrust on the material to be pressed.

Figure 2:
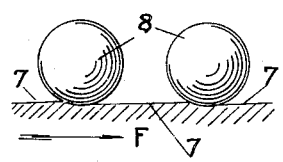
Fig. 2 is a detail view corresponding to Fig. 1.

A casing 3 forms a part of a perforated plate 4 actuated by a pawl device commonly used in the technic of wine or like presses. This casing is angularly connected, by tenons 5 or equivalent means, to a crown 6 the upper face of which is so formed as to present a series of inclines 7 shown in cross section in Fig. 2.

To each of these inclines corresponds a ball 8 arranged in a cage 9 which ensures the suitable angular distribution of all the balls on which a first nut 10 can take a bearing through a ballrace 11. The cage 9 is moreover angularly connected to the nut 10 by a friction or brake device comprising one or more shoes 12 pressed against an inner bearing portion of the cage 9 by springs 14. The construction of the brake can be of any nature and does not form a part of the invention.

The lower face of the crown 6 is provided with a ball race 15 for balls 16, through the medium of which it bears on the plate 2, a second ballrace 17 being secured on the latter.

A second brake 12ª, such as that described for the nut 10, ensures an angular friction connection between the cam crown 6 and the second nut 18, which is completely free relatively to the latter in the axial direction.

As in the known embodiments, the casing 3 acts on the nut 10 through the medium of springs 20 circularly distributed and arranged between bosses 21 of the nut 10 and corresponding bosses 22 provided on a crown 23 angularly connected to the casing 3 by a friction connection or brake 24, of any suitable construction.

The operation is as follows:

The nut 18 being pressed on the plate 2 by its base, transmits to the worm 1 the reaction produced by the pressed materials. By causing the casing 3 to rotate relatively to the balls 8, which are fixed owing to the fact that their cage 9 is connected by the brake 12 to the nut 10, in the direction corresponding to the arrow 7 of Fig. 2, the balls 8 taking a bearing on the nut 10, axially move the plate 2 downwardly. During this movement, the nut 18, angularly driven by cam 6, has remained in contact with the plate 2, the angular connection between the nut 18 and cam 6 being eliminated by a slipping movement as soon as the nut 18 abuts against the plate 2. In fact, it will be understood that, the pitch of the worm 1 being greater than that of the inclines 7, the translations of the plate 2 are lagging relatively to those of the nut 18.

As soon as the balls 8 are at the top of the inclines 7 a subsequent movement of the casing 3 immediately causes the reaction of cam 6 on nut 10 to cease, the relaxation of the springs 20, previously compressed by the movement of the casing 3, causing the nut 10 to rotate on the worm until contact between cam 6 and nut 10, through the balls 8, is again established. A subsequent movement of the casing 3 reproduces the functions which have just been described and lowers the plate 2. The angular movement of casing 3 being more considerable than that of nut 10, the brake 24 of crown 23 slips on the casing 3 when the springs are sufficiently compressed.

After downward movement of the plate 2, at the end of the tightening action, for raising the entire device along the worm 1, a pin or key 25 is inserted, through the upper part, into perforations of the nuts 10 and 18, so as to render the latter angularly rigid with the casing 3. The cam 6 and balls 8 are rendered inoperative and the entire device rises as a single nut along the worm 1.

In the constructional example of Fig. 3, a worm 1 receives two nuts 2 and 3 which, at their bases, bear on the row of balls 4 and 5, respectively, resting on a cam 6 which bears in its turn through a ball abutment, on a bed plate 8. If the worm 1 is axially fixed, the bed plate 8 moves along the latter; if the bed plate 8 is fixed, the worm 1 moves axially.

The cam 6 is angularly rigid with a casing 9 enclosing the two nuts and arranged for receiving a continuous movement of rotation by any conventional means, as desired.

The angular connection between the nuts 2 and 3 and casing 9 is ensured solely by friction. For that purpose, a number of friction shoes 10 are uniformly distributed on the casing 9 and guided in radial perforations provided, on the one hand, in the upper bottom 11 of the casing 9 and, on the other hand, in the cam 6. Springs 12 act for pressing the shoes 10 against bearing portions 2a and 3a of the nuts by taking a bearing on screws 14. The lower screws can, moreover, as shown, ensure permanent angular connection between the cam 6 and casing 9.

The mechanical characteristics of the springs 12 determine the importance of the frictions connecting the casing 9 and nuts 2 and 3. The springs 12 can of course be displaced by any other means for restoring the shoes in contact with the nuts.

The two rows of balls 4 and 5, in contact with the same cam 6 and on which respectively bear the nuts 2 and 3, can be arranged in a cage 15 in the known manner (Fig. 4), or they can be held in grooves 16 which, on cam 6, are cut parallel to the alternately inclined faces 17 and 18 of the latter.

With a friction connection of the nuts 2 and 3 and casing 9 the pitch $\beta$ of the cam can have substantially any value relatively to the pitch of the worm. Extreme accuracy in the manufacture of the cam is not consequently required but, moreover, as will appear from the description of the operation of the device given hereinafter, when no load exerts itself on the worm, both nuts are operated as a single member at the speed of rotation of the casing, whilst when a load is to be overcome, the tangential stress, exerted by the cam 6 on the nut to which it must transmit an axial stress, is reduced relatively to the driving torque to be exerted on the casing 9.

The operation is as follows:

A rotation being imparted to the casing 9 in the direction of the arrow 19, the balls such as 4a retained by the fact that they wedge against the nut 2 supporting the reaction exerted by the worm 1, cannot rotate relatively to the latter.

Each ball 4a is lifted by an incline 17 on which it rolls (direction of the arrow 20). As it also rolls on the groove 16 of the nut 2, it moves relatively to this nut according to an angle equal to half the angular displacement of cam 6. This angular displacement corresponds in fact to the sum of the arcs of contacts developed on cam 6 and on nut 2. These arcs are equal if the ball has rolled on one and the other of these members, without slipping, which is the case. It results therefrom that the ball lifts, according to the distance $\beta$ only for an angular displacement $\alpha$ of cam 6, that is to say for an angular displacement corresponding to an upward incline 17 and to a downward incline 18.

The nut 3, in order to remain in contact with cam 6 through the balls 5, must move down according to the distance the worm has been lifted, viz: first according to $\beta$, then again according to $\beta$, since the balls 5 have rolled to the bottom of the low portions of the cam. The nut 3 must therefore move down in all to the extent of $2\beta$ for an angular displacement of the cam equal to $\alpha$. It is therefore necessary that the pitch of the worm should be at least equal to twice the pitch of the cam expressed by $\beta$. But, owing to the friction connection between the cam 6 and nuts 2 and 3, the pitch of the worm can be greater than this value, a slipping movement taking place between the cam and nut which rotates, as soon as the latter bears on said cam through the medium of the balls. It will therefore be seen that inaccuracies of machining of the cam, or of the worm, are without real importance provided the pitch of the worm is at least equal to twice the pitch of the cam.

The friction exerted by the shoes 10 on the nuts can be very small, since it acts only for moving, along the worm 1, the nut which is not subjected to any axial stress. However, a certain value can be given to this friction, in order to allow of simultaneously moving both nuts along the worm loads of any desired value determined by adjusting the importance of the friction, are exerted on the cam or on the worm. In this movement, at each revolution of the unit constituted by the casing 9, cam 6 and nuts 2 and 3, the relative axial displacement is equal to the pitch of the worm, that is to say twice greater than when a load is exerted on the worm.

In the application of devices thus improved, to lifting jacks, gate valves, clamping apparatus, this feature is of very great advantage. Operation without load takes place rapidly and speed reduction automatically occurs as soon as a load produces between screw threads a friction greater than that exerted by the shoes 10. All the advantages of the ordinary worm and nut system are thus obtained, with in addition, a considerable increase of the efficiency for heavy loads.

In the arrangement described, if the casing 9 is rotatively driven in the direction reverse to that indicated by the arrow 19, the unit constituted by both nuts 2 and 3 acts as an ordinary nut, the load then acting for promoting the relative axial movement. This action is so much the more favourable as the pitch of the worm more nearly approximates the value of reversibility.

But, when it is desired to obtain a device acting in two directions, the embodiment illustrated in Fig. 6 can be resorted to. In this embodiment, two cams 6 and 6a are provided which are angularly rigid with the same casing 9, made of two parts suitably assembled. Each nut 2 or 3 can bear on a cam, for one direction of the load, and on the other for the opposed direction. A first bearing is taken directly through the base 2a and 3a, and a second bearing is taken through rings 21 and 22 connected to fingers 23 and 24 of the nuts 2 and 3, respectively, the fingers of one nut fitting between the intervals of the fingers of the other nut for allowing the required relative angular displacement.

In this embodiment, the balls 4 and 5, corresponding to each cam 6, 6a, are distributed in two tangent rows and held between the side bearing portions 24 and 25, in order to ensure a correct guide action without resorting to a cage or to grooves such as 16 of Fig. 3.

Figs. 9 to 11 illustrate an example of application of devices of the type described and improved or not according to the features of the present invention, to a worm and worm wheel system.

A worm wheel 26 meshes with a worm 27 the screw threads of which are divided into two distinct portions 27a and 27b. The portion 27a terminating in a rod 28, bears, through its flange 29, on one of the rows of balls 30 of a cam 31 rigid with the casing 32 receiving, in any suitable manner, the driving stress applied to the worm and transmitted to the wheel 26. The unit constituted by the casing 32 and the cam 31 abuts for instance at 33 on a bearing and the driving stress of the worm is applied to the shaft 35.

The portion 27b bears, through its flange 36, on the other row of balls 37 of the cam 31, and shoes 38, restored by springs, ensure the friction connection between the cam 31 and the parts 27a and 27 which correspond to the nuts 2 and 3 of the embodiments already described.

The operation is identical to that of the other embodiments. When the part 27a acts, by a tangential thrust and without rotation about the axis X—X on the wheel 26, the part 27b remains in contact with the cam 31 by rotating about the axis X—X. The remarks already made concerning the features of the cam and of the worm are exactly applicable in this embodiment.

Only one of the portions of the worm 27 acts at a time by exerting a tangential thrust on the wheel 26 and must support the stress which, in the known worm and worm wheel system, would be distributed on the screw threads of both portions. For remedying the inconvenience, it suffices to give to the screw threads of the worm and to the teeth of the wheel a suitable section. For that purpose, the diameter of the worm can be increased, and this increase will not have any inconvenience, since the frictions between the screw threads are eliminated. For the same purpose, resort can also be made to the arrangement, illustrated in Fig. 13 and described later on.

Fig. 10 shows an embodiment in which the worm can indifferently act on the worm wheel, in one direction or the other. This embodiment is the transposition, in the application contemplated the device shown in Fig. 6.

Two cams 31 and 31a are used and rigidly secured on a common shaft 35 to which is applied, in one direction or in the other, the driving torque of the worm. Each of the cams abuts, through balls 33, against a bearing 39. The portion 27a of the worm is frictionally connected, by the means already described to cam 31, the portion 27b is similarly connected to the cam 31a and one and the other of the portions 27a and 27b are provided with extensions 40 passing through corresponding recesses 41 of the opposed portion for fitting into a bowl 42, each of which takes a bearing on the inner row of balls 43 of each of the cams 31 and 31a. The portions 27a and 27b of the worm bear, on the other hand, directly on the corresponding cam through the row of outer balls 44. Each of the cams 31 and 31a acts for a definite direction of rotation of shaft 35.

Such an arrangement is advantageously applicable to the direction of heavy motor vehicles, lorries in particular, for reducing the importance of the stresses to be exerted, all things being equal, on the steering wheel.

It is of course generally applicable to all worm and worm wheel mechanisms and is particularly suitable for hoisting apparatus (tackles and winches) subjected to very important stresses.

The characteristic principles of the invention such as they have just been set forth can be carried out with a single nut, or with a nut having two inner screw threads, common to two worms, instead of a single worm common to two nuts as in the embodiments previously described.

Thus, in the example of construction illustrated in a somewhat diagrammatic form in Fig. 12, a nut 45 having two inner screw threads is fitted on two worms 46 and 47 held parallel and taking a bearing on cams 48 and 49, respectively. These cams are similar to those of the preceding examples and are connected, by friction shoes 50, to their respective worms which rest, through their flanges 46a and 47a, on balls 51 subjected to the action of the inclines of the cams.

In this embodiment, cages 52 are provided for holding the balls. These cages have peripheral teeth 53, having the same pitch circle and constantly in mesh so that the rotation of one of them causes that of the other, but in reverse direction.

The cams are, in the same manner, angularly connected together by teeth 54 and one of them moreover meshes with a pinion 55 receiving the driving force.

The operation is as follows:

A load, exerted on the nut 45, is uniformly distributed on the two worms, but the respective settings of both cams are such that one acts, through its upward inclines, on the balls 51, whilst the other has its downward inclines in action. The cam acting through its upward inclines lifts its worm (the worm 46 for instance) which supports alone the load applied on the nut. It is thus not subjected to a movement of rotation, but simply receives an axial displacement which, for a rotation of the cam equal to α (Fig. 3), is only β. The worm 47 on which no load is exerted rotates through an angle α, owing to its friction connection with cam 49. But if reference is made to the explanations already given concerning Fig. 3, the pitch of the worm being at least 2β, it will be seen that the worm 47 has received an axial translation of 2β relatively to the nut 45. This translation is decomposed into β which represents the absolute lift of the nut connected in translation to the worm 46 and into β representing the absolute lowering of worm 47 which has followed the downward inclines of its cam 54. The worm 47 is then ready to be lifted to the extent of β, without rotation, and the worm 46 is ready to lower to the extent of β, by rotating through an angle α, the load of the nut 45 being exerted on the worm 47.

The movement of the nut 45, by alternate pulls of the worms 46 and 47, is therefore ensured in the same conditions as with the devices described.
The same principle is applicable to the worm and worm wheel system. It suffices to provide, for one and the same shaft 55, two worms and worm wheel devices 56—57 and 58—59. Each worm is connected, by its shaft 60 and 61, to a cam control similar to that described with reference to Fig. 10. One of the worms acts by a tangential thrust, on its worm wheel, whilst the other rotates relatively to its own wheel. The unit constituted by the two worm wheels 56 and 58 rigidly secured on the same shaft 52 is assimilable to the nut 45 of Fig. 10, and the worms 57 and 59 fulfill the function of the worms 46 and 47.

What I claim as my invention and desire to secure by Letters Patent is:

1. In a power transmitting device for converting a continuous rotation into a translation parallel to the axis of the said rotation or into another type of rotation about an axis disposed at right angles to the axis of the first one, a driving member adapted to be rotated, a driven member provided with engagement means, two rotatable members provided with corresponding engagement means engaging the first mentioned engagement means of the driven member, means including at least a cam provided with inclined planes, means for rotatably coupling the said cam with the driving member, balls interposed between the inclined planes of the said cam and at least one of the rotatable members in order to act periodically upon the said rotatable member in an axial direction, and frictional means interposed between the driving member and the rotatable members and adapted to allow a free rotation of the said driving member with respect to the rotatable members when the latter receive an axial stress from the driven member.

2. In a power transmitting device for converting a continuous rotation into a rectilinear translation, a driven member consisting of a screw adapted to be moved into an axial translation, a driving member adapted to be rotated coaxially with respect to the screw, two nuts screwed upon the said screw, a cam provided with inclined planes adapted to be rotated coaxially with respect to the screw, means for fixing said cam in axial directions, balls interposed between the inclined planes and the nut and capable of acting upon said nut in an axial direction, means for rotatably coupling the cam and said driving member, and frictional means between the driving member and the nuts adapted to allow a free rotation of the driving member and cam with respect to the nuts when the latter receive and axial stress or thrust from the driven member.

3. In a power transmitting device for converting a continuous rotation into a rectilinear translation, a fixed screw, a driving member adapted to be rotated with respect to said screw, a driven member acted upon by the driving member and adapted to be moved lengthwise of the screw, two nuts screwed upon said screw, a cam provided with inclined planes, means for rigidly coupling said cam and said driving member, balls interposed between said inclined planes and the nuts and adapted to act upon said nuts in an axial direction, and frictional means between the driving member and the nuts adapted to allow a free rotation of said driving member and cam with respect to the nuts when the latter receive an axial stress or thrust from the driven member.
4. In a power transmitting device for converting a continuous rotation into a rectilinear translation, a driven member consisting of a screw adapted to be moved in an axial translation, two nuts screwed upon said screw, a driving member consisting of a housing enclosing said two nuts and adapted to be rotated coaxially with respect to the screw, means for retaining the said housing against axial displacement, frictional shoes upon the driving member adapted to rotate with the same, means for resiliently applying said shoes against the nuts, a cam rigidly coupled with the driving member and provided with inclined planes forming alternated recesses and projections, balls interposed on the one hand between the recesses and one of the nuts, and on the other hand between the projections and the other nut, and a ball race for maintaining the balls spaced apart.

5. In a power transmitting device for converting a continuous rotation into a rectilinear translation, a fixed screw, two nuts screwed upon said screw, a driving member consisting of a housing enclosing said nuts and adapted to be rotated coaxially with respect to the screw and nuts, a driving member (and adapted to be moved lengthwise of the screw) acted upon by the driving member, frictional shoes upon the driving member adapted to rotate with the same, means for resiliently applying said shoes against the nuts, a cam rigidly coupled with the driving member and provided with inclined planes forming alternated recesses and projections, balls interposed on the one hand between the recesses and one of the nuts and on the other hand between the projections and the other nut, and a ball race for maintaining the balls spaced apart.

ALDO FIORENTINO.